(12) United States Patent
Jalaguier

(10) Patent No.: US 8,376,269 B2
(45) Date of Patent: Feb. 19, 2013

(54) HYDRAULIC VALVE, A HYBRID HELICOPTER PROVIDED WITH SUCH A HYDRAULIC VALVE, AND A METHOD IMPLEMENTED BY THE HYDRAULIC VALVE

(75) Inventor: Jean-Pierre Jalaguier, Vitrolles (FR)

(73) Assignee: Eurocopter, Marignane Cedex (FR)

( * ) Notice: Subject to any disclaimer, the term of this patent is extended or adjusted under 35 U.S.C. 154(b) by 514 days.

(21) Appl. No.: 12/628,406

(22) Filed: Dec. 1, 2009

(65) Prior Publication Data

US 2010/0133375 A1 Jun. 3, 2010

(30) Foreign Application Priority Data

Dec. 1, 2008 (FR) ...................................... 08 06735

(51) Int. Cl.
*B64D 35/00* (2006.01)
(52) U.S. Cl. ............................ 244/60; 416/156; 416/158
(58) Field of Classification Search ................. 244/6, 60; 416/156–158, 147, 153, 159
See application file for complete search history.

(56) References Cited

U.S. PATENT DOCUMENTS

| | | | | | |
|---|---|---|---|---|---|
| 3,219,121 | A | * | 11/1965 | Barden | ........................ 416/154 |
| 3,261,406 | A | * | 7/1966 | Goodman et al. | ............. 416/35 |
| 3,263,754 | A | * | 8/1966 | Belliere | ..................... 416/157 R |
| 4,028,004 | A | * | 6/1977 | Wind | ........................ 416/157 R |
| 4,533,296 | A | | 8/1985 | Duchesneau et al. | |
| 4,563,099 | A | | 1/1986 | Brandenstein et al. | |
| 5,174,718 | A | * | 12/1992 | Lampeter et al. | ................ 416/48 |
| 5,186,608 | A | * | 2/1993 | Bagge | ............................. 416/37 |
| 5,897,293 | A | * | 4/1999 | Arel et al. | ........................ 416/46 |
| 6,513,752 | B2 | | 2/2003 | Carter, Jr. | |
| 7,758,310 | B2 | * | 7/2010 | Cotton et al. | ............. 416/157 R |
| 2002/0011539 | A1 | | 1/2002 | Carter | |
| 2008/0169379 | A1 | * | 7/2008 | Cotton et al. | ................... 244/60 |

FOREIGN PATENT DOCUMENTS

| | | |
|---|---|---|
| CA | 720239 A | 10/1965 |
| EP | 1348622 A2 | 10/2003 |
| FR | 2544414 A1 | 10/1984 |
| FR | 2554414 A1 | 5/1985 |

OTHER PUBLICATIONS

French Preliminary Search Report for Application No. FA 717351, dated Jul. 15, 2009.

* cited by examiner

*Primary Examiner* — Philip J Bonzell
(74) *Attorney, Agent, or Firm* — Brooks Kushman P.C.

(57) ABSTRACT

A hydraulic valve assembly includes a hydraulic valve, a control rod configured to be moved in translation along a first longitudinal axis by flight controls of an aircraft, a servocontrol, and an outlet rod configured to be moved in translation along a second longitudinal axis and configured to transfer a hydraulic fluid between the servocontrol and the hydraulic valve. A blocker device is configured to block a movement of the control rod when a difference between a first movement of the control rod and a second movement of the outlet rod exceeds a predetermined threshold and includes at least one moveable abutment configured to block the movement of the control rod when the predetermined threshold is reached and configured to move in longitudinal translation with the outlet rod, and a differential lever configured to mechanically link the control rod to the outlet rod and to cooperate with the at least one moveable abutment.

13 Claims, 3 Drawing Sheets

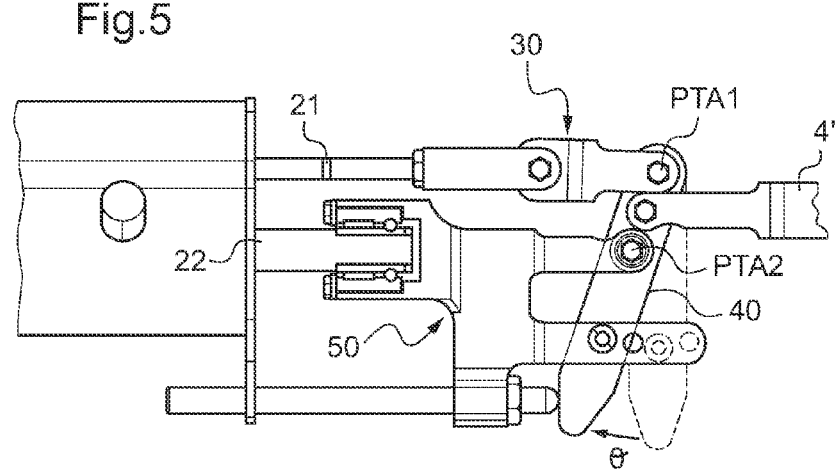
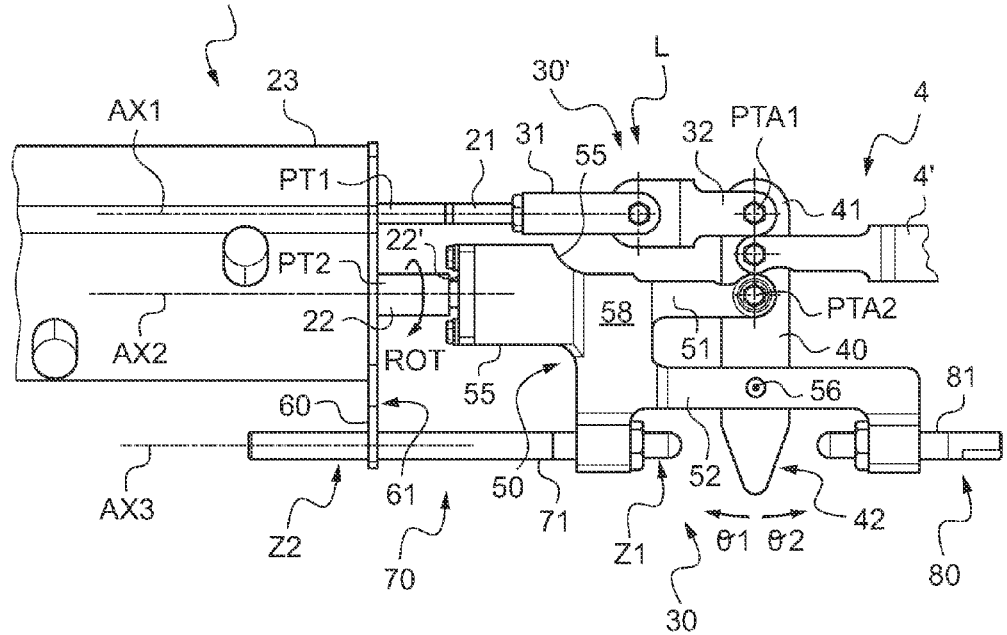

HYDRAULIC VALVE, A HYBRID HELICOPTER PROVIDED WITH SUCH A HYDRAULIC VALVE, AND A METHOD IMPLEMENTED BY THE HYDRAULIC VALVE

Priority is claimed to French Application No. 08 06735, filed Dec. 1, 2008, the entire disclosure of which is incorporated by reference herein.

The present invention relates to a hydraulic valve, to a hybrid helicopter provided with such a hydraulic valve, and to a method implemented by the hydraulic valve. More particularly, the invention relates to a hybrid helicopter relating to an advanced concept of a vertical takeoff and landing aircraft "VTOL aircraft".

This advanced hybrid helicopter concept combines at reasonable expense the efficiency in vertical flight of a conventional helicopter with the high travel speed performance made possible by using propulsive propellers and installing modern turbine engines.

BACKGROUND

In order to thoroughly understand the purpose of the invention, it is appropriate to consider the main kinds of flying machine that correspond to airplanes and to rotorcraft. The term "rotorcraft" covers any aircraft in which lift is provided in full or in part by one or more propellers of substantially vertical axis, and of large diameter, known as rotors or indeed as rotary wings. In the rotorcraft category, various distinct types of rotorcraft are distinguished.

Firstly, there is the helicopter, in which at least one main rotor driven by a suitable engine serves to provide both lift and propulsion. Then, there is the autogyro, which is a rotorcraft in which the rotor is not powered, but provides lift by autorotation under the effect of the forward speed of the aircraft. Propulsion is provided by a turbine engine, or indeed by a propeller of axis that is substantially horizontal in forward flight, and driven by a conventional engine.

The gyrodyne is a rotorcraft intermediate between the helicopter and the autogyro in which the rotor provides lift only. The rotor is normally driven by an engine installation during stages of takeoff, hovering, vertical flight, and landing, like a helicopter. A gyrodyne also has an additional propulsion system that is essentially different from the rotor assembly. In forward flight, the rotor continues to provide lift, but solely in autorotation mode, i.e. without power being transmitted to said rotor.

Several other novel formulae have been studied to a greater or lesser extent, and some of them have given rise to practical embodiments.

In this respect, mention can be made of the compound rotorcraft that takes off and lands like a helicopter, and that performs cruising flight like an autogyro: its rotor moves by autorotation because of the forward speed of the aircraft and provides some of the lift, while the remainder of the lift is provided by an auxiliary wing. A tractor propeller with a substantially horizontal axis delivers the force needed for movement in translation.

Similarly, document U.S. Pat. No. 6,513,752 discloses an aircraft comprising:
  a fuselage and a wing;
  two variable pitch propellers;
  a rotor with "end" masses;
  a power source driving the two propellers and the rotor;
  control means for adjusting the pitch of the propellers so that:
    in forward flight, the thrust from the propellers is exerted towards the front of the rotorcraft; and
    in hovering flight, the antitorque function is provided by one propeller providing thrust towards the front and the other propeller towards the rear of the rotorcraft, with the rotor being driven by the power source; and
  the power source comprises an engine and a clutch that, by disconnecting the rotor from the engine, enables the rotor to turn faster than an outlet from said engine, because of the above-mentioned masses.

It is also specified that the clutch enables the aircraft to fly in autogyro mode during forward flight. Consequently, the aircraft described in U.S. Pat. No. 6,513,752 is of the compound type. In addition, the power transmission gearbox located between the power source and the propellers enables said propellers to operate at a plurality of different speeds of rotation relative to the speed of an outlet of said power source.

A convertible rotorcraft constitutes another particular formula for a rotorcraft. This term covers all rotorcraft that change configuration in flight: takeoff and landing in a helicopter configuration, cruising flight in an airplane configuration, e.g. having two rotors that are tilted through about 90° so as to act as propellers. Another novel formula is known for convenience as a "hybrid helicopter". A hybrid helicopter comprises a fuselage, a rotary wing provided with a main rotor for driving blades in rotation by means of at least one turbine engine.

In addition, a hybrid helicopter has a wing made up of two half-wings, with two propulsive propellers being placed on the half-wings on either side of the fuselage. Furthermore, a hybrid helicopter is fitted with an integrated drive system that comprises not only the turbine engine(s), the rotor of the rotary wing, and the two propellers, but also a mechanical system for interconnecting those elements.

With this configuration, the speeds of rotation of the outlet(s) from the turbine engine(s), of the propellers of the rotor, and of the mechanical interconnection system are mutually proportional, with the proportionality ratio being constant regardless of the flying configuration of the hybrid helicopter under normal conditions of operation of the integrated drive system. Consequently, and advantageously, the rotor is always driven in rotation by the turbine engine(s), and it always develops lift regardless of the configuration of the hybrid helicopter, both in forward flight and while hovering. A hybrid helicopter is thus neither an autogyro, nor a gyrodyne, nor a compound rotorcraft, but is a novel type of rotorcraft.

More precisely, the rotor serves to provide all of the lift for a hybrid helicopter during stages of takeoff, landing, and vertical flight, and to provide some lift in cruising flight, with the wing then contributing to some extent to support said hybrid helicopter. Thus, the rotor provides most of the lift of a hybrid helicopter in cruising flight possibility together with a small contribution to propulsion or traction forces, and always in a minimum drag configuration. The antitorque and yaw control functions are provided by exerting differential thrust with the propellers. For example, in vertical flight and assuming that the rotor turns clockwise, the propeller on the left of the fuselage exerts thrust towards the rear of the hybrid helicopter while the propeller on the right produces thrust towards the front. To pilot a hybrid helicopter, it is therefore appropriate to act on the pitches of the propellers of the hybrid helicopter.

Consequently, the flight controls of a hybrid helicopter act on servocontrols that are suitable for modifying the pitches of the propeller blades via control means that are controlled by the pilot or indeed by an autopilot. Like in airplanes, a first servocontrol is arranged in the left propeller hub to control its pitch, while a second servocontrol is arranged in the hub of the right propeller. Since the space available inside a hub is small, each servocontrol is itself controlled via an outlet rod of a hydraulic valve, the hydraulic valve delivering fluid to the servocontrol in order to modify the pitch of the blades of the corresponding propeller.

Consequently, the hydraulic valve is provided with a control rod that is connected to the flight controls. Action taken on the flight controls causes the control rod to move, and consequently causes the slide of the associated hydraulic valve to move. As it moves, the slide of the hydraulic valve enables a fluid to flow from the hydraulic valve to the servocontrol, and vice versa. Such a propeller control device is conventional on airplanes. Nevertheless, it should be observed that the distance between the hydraulic valve and the servocontrol is considerable, thereby giving rise to a non-negligible amount of head loss.

Consequently, propeller pitch variation takes place relatively slowly. Thus, the reaction time of the device between a first moment when the pilot gives an order and a second moment when the order has been accomplished is relatively long. This slowness in pitch control is of no problem on an airplane, since the pitch of a propeller is controlled depending on the power delivered by the engine installation of the airplane. Since engine regulation is slow, it is not troublesome for propeller pitch to vary slowly.

The same applies to a hybrid helicopter. When the pilot modifies the power of the engine installation, a computer modifies the pitch of the left and right propeller blades slowly and collectively by the same amount, via an electric motor of a rotary trim actuator, for example. In contrast, in order to obtain yaw control for a hybrid helicopter, the pilot uses the pedals. Unfortunately, in order to counter a gust of wind, or in order to avoid an obstacle, the pilot might impart fast movement to the pedals over a large amplitude.

The assembly comprising the hydraulic valve and the servocontrol then responds slowly, so the pilot's order is not immediately put into effect. Since the pilot does not see the aircraft respond there is a danger of the pilot wondering whether operation is still normal, or whether the flight control is faulty. This leads to a problematic situation in which the pilot might start performing actions that ought not to be performed, e.g. by giving an order contrary to the initial order. The state of the art provides various solutions. For example, document EP 1 348 622 provides for incorporating a damper having a damping coefficient that varies as a function of the rate of variation speed of the flight control. Nevertheless, that factor appears to be insufficient insofar as the amplitude of the movement can also have an impact.

SUMMARY OF THE INVENTION

An aspect of the present invention is thus to propose a hydraulic valve provided with a control rod and an outlet rod suitable for controlling a servocontrol of a hybrid helicopter while also enabling a pilot to be aware that the control linkage going from the pilot's control means to the propeller blades is operating properly, even though the assembly comprising the hydraulic valve and the servocontrol has a reaction time that is not zero.

It should also be observed that document FR 2 544 414 provides for a hydraulic valve having control rods and control valves. Nevertheless, it does not have a moving outlet rod, but rather it has stationary outlet pipework. Document FR 2 554 414 is therefore far removed from the invention.

According to the invention, a hydraulic valve is provided firstly with a control rod suitable for being moved in translation along a first longitudinal translation axis by flight controls of an aircraft via control means of the pedal type or via an electronic computer, and secondly with an outlet rod suitable for being moved in translation along a second longitudinal translation axis, and in rotation about said second longitudinal axis, and for transferring a hydraulic fluid between a servocontrol and the hydraulic valve.

This hydraulic valve is remarkable in particular in that it includes blocker means for blocking the control rod, the blocker means being capable of temporarily blocking movement in translation of the control rod when a difference between a first movement of the control rod and a second movement of the outlet rod is greater than a predetermined threshold, beyond which threshold a first longitudinal position of the outlet rod is no longer representative of a second longitudinal position of the control rod.

It should be observed that that the term "first movement" designates the first distance traveled by the control rod along the first longitudinal translation axis when action is taken on the flight controls of the aircraft.

Similarly, the term "second movement" designates the second distance traveled by the outlet rod along the second translation longitudinal axis as a result of the action taken on the flight controls of the aircraft.

Thus, said difference between the first movement of the control rod and the second movement of the outlet rod corresponds to the control rod moving relative to the outlet rod over a length equal to the first distance minus the second distance.

Consequently, the blocker means prevent movement of the control rod, e.g. as a result of the action taken on the pedals, whenever the combination of the speed and amplitude of the travel of the pedals gives rise to a difference between the first movement of the control rod and the second movement of the outlet rod, and thus to a movement of the control rod relative to the outlet rod, presenting an amount that exceeds a threshold having a predetermined value.

Beyond the threshold, the assembly comprising the hydraulic valve and the servocontrol is no longer capable, without a time delay, of accurately transcribing the order that has been given. Thus, the pilot will feel that the pedals are blocked and will understand that the order given has gone beyond the capacity of the hydraulic valve and the servocontrol assembly.

The pedals are then blocked in a third position. Nevertheless, this blockage is only temporary. As soon as the hydraulic valve causes the pitch of the blades to change, the blocker means release the pedals so as to allow the pilot to continue acting on them. In contrast, if the combination of the speed and the amplitude of the travel of the pedals does not cause the control rod to move relative to the outlet rod by more than said threshold, then the hydraulic valve and servocontrol assembly responds with a time delay that is negligible. The blocker means then do not block the movement of the control rod and thus do not block the movement of the pedals.

Furthermore, the hydraulic valve may possess one or more of the following additional characteristics. Advantageously, the blocker means comprise at least one movable abutment for blocking movement in translation of the control rod when the threshold is reached, said movable abutment being suitable for moving in longitudinal translation together with the outlet rod.

In a purely mechanical embodiment of the invention, the blocker means comprise a differential lever suitable for mechanically linking the control rod to the outlet rod and suitable for co-operating with each movable abutment. Thus, the differential lever serves to block the control rod by cooperating with a movable abutment, while also representing means for copying position.

The second longitudinal position of the outlet rod, e.g. relative to a stationary outer casing of the hydraulic valve, is representative of the first position of the control rod, and thus of the third position of the pedals operating by the pilot. When the assembly comprising the hydraulic valve and the servocontrol does not present any delay, the pedals, the control rod, and the outlet rod all move at speeds that are substantially identical. Nevertheless, if the pilot moves the pedals with a combination of speed and amplitude of their travel that is excessive, then the control rod makes a first movement over a first distance that is large. In contrast, the outlet rod makes a second movement over a second distance that is less than the first distance because of the inertia of the hydraulic valve and servocontrol assembly.

If the difference represented by the first movement minus the second movement, i.e. the difference between the first distance and the second distance, is greater than the predetermined threshold, then the outlet rod is becoming too delayed, and the blocker means block the control rod.

The position copying means then allow the pilot to be aware of the pitch of the propeller blades, since a given pitch corresponds substantially to a third position of the pedals as given by this position copying. Furthermore, the differential lever is optionally provided with first, second, and third branches, the first branch being fastened to the control rod, and the third branch being fastened to the outlet rod. The second branch is then hinged to the first and third branches, and is suitable for being hinged to the flight controls, e.g. to a attack rod of the flight control.

Optionally, the first branch comprises a fork and a link that are hinged to each other, the fork being fastened to the control rod and the link being hinged to the fork and to the second branch. As explained below, the first hinge point between the first branch and the second branch can be required to move along a circular arc. Thus, splitting the first branch into a fork and a link serves to avoid deforming the control rod.

Furthermore, since the outlet rod is suitable for performing rotary movement about the second longitudinal axis, the third branch includes fastener means suitable firstly for constraining the third mechanical to move in translation with the outlet rod along the second longitudinal axis, and secondly for allowing the outlet rod to rotate relative to the third branch about said second longitudinal axis. Advantageously, said third branch is provided with a first finger hinged to said second branch, said first finger being arranged to extend the outlet rod.

Furthermore, each movable abutment may be constrained to move in translation with the outlet rod and with the third branch. Thus, each movable abutment moves along a third longitudinal translation axis parallel to the first and second longitudinal translation axes. When the outlet rod catches up its delay relative to the control rod, the movable abutment moves and releases the control rod, and thus releases the flight control. For example, with the second branch being provided with a fixed end that is hinged to the first branch and with a free end, each movable abutment blocks angular movement of the free end of the second branch when the threshold is reached.

Thus, since the second branch can no longer move, the second branch prevents the first branch from moving and consequently prevents the control rod and the flight controls from moving, and in particular prevents the pilot's pedals from moving. Furthermore, for the blocker means including a first movable abutment, the first movable abutment comprises a first stop rod passing through a second finger of the third branch, a first end zone of the first stop rod being suitable for co-operating with the free end of the second branch so as to block said second branch. More precisely, the first stop rod includes a thread that co-operates with tapping in the second finger. The first rod is then screwed into the second finger.

When the control rod moves faster than the outlet rod, the second branch turns about its second hinge point connecting it to the third branch that is secured to the outlet rod. The free end of the second branch may then optionally come into contact with the first end zone of the first stop rod, thereby blocking further movement thereof, and consequently blocking movement in translation of the control rod.

More precisely, if the difference between the first distance traveled by the control rod during its first movement and the second distance traveled by the outlet rod during its second movement exceeds a predetermined threshold, then the free end of the second branch enters into contact with the first end zone of the first stop rod.

Furthermore, when the hydraulic valve has an outlet casing provided with a stop plate, a second end zone of the first rod passes through an orifice in said top plate. Thus, if the outlet rod tends to cause the third branch to rotate about the second longitudinal axis, e.g. by friction, then the stop rod co-operates with the orifice in the stop plate to prevent said rotation.

In a first variant, the blocker means comprise only a first movable abutment for blocking movement of the control rod in a single direction.

In a second variant, the blocker means comprise first and second movable abutments constrained to move in translation with said outlet rod and with said third branch so as to block movement of the control rod in two opposite directions. The free end of the second branch is then blocked angularly between said first and second movable abutments.

Finally, the third branch is advantageously provided with a hole suitable for occasionally receiving a pin that co-operates with the second branch to block it, e.g. while maintenance operations and adjustments are being performed.

In addition to a hydraulic valve, the present invention also provides a hybrid helicopter having the claimed hydraulic valve.

Thus, according to the invention, a hybrid helicopter includes a fuselage and comprises:
 a rotary wing provided with at least one main lift rotor, having a plurality of blades and arranged above the fuselage;
 a supplementary lift surface provided with first and second half-wings extending on either side of the fuselage, each half-wing being provided with a propeller;
 a mechanical interconnection system between the main rotor and the propellers; and
 at least one turbine engine for continuously driving the main rotor and the propellers in rotation by meshing with the mechanical system.

The hybrid helicopter is remarkable in that each propeller is controlled by a servocontrol via a hydraulic valve, the hydraulic valve being provided with a control rod suitable for being moved in translation along a first longitudinal translation axis by flight controls of the hybrid helicopter, and with an outlet rod suitable for being moved in translation along a second longitudinal translation axis and for transferring a hydraulic fluid between the servocontrol and the hydraulic valve, blocker means for the control rod, provided with at least one movable abutment, and being capable of temporarily blocking movement in translation of the control rod when a difference between a first movement of the control rod and a second movement of the outlet rod is greater than a predetermined threshold, beyond which threshold the first longitudinal position of the outlet rod is no longer representative of the second longitudinal position of the control rod.

In addition, in a preferred first variant of a purely mechanical embodiment, the blocker means have only a first movable abutment suitable for being moved in translation longitudinally together with said outlet rod. Such a configuration may appear to be inappropriate insofar as the pitch of the blades of a propeller can be increased or decreased, depending on requirements.

Nevertheless, it should be recalled that identical variation to the pitches of the blades of the propellers of a hybrid helicopter takes place slowly. Consequently, the blocker means are normally inoperative during actions of that type. In contrast, the situation is different when the pilot is applying yaw control to the hybrid helicopter. The pilot then requires the pitch of the blades of a first propeller to increase and the pitch of the blades of the second propeller to decrease.

Consequently, the control rod of one hydraulic valve will move in a first direction while the control rod of the other hydraulic valve will move in a second direction. It is therefore certain that should it become necessary, one of the control rods will become blocked by an abutment, thereby causing the flight controls to be totally blocked and thus blocking the other control rod.

Thus, surprisingly, it suffices for each of the hydraulic valves to be identical and to possess only one respective movable abutment, for blocking movement of the control rod of the valve for movement thereof in the same direction.

More precisely, if the first hydraulic valve of the first propeller blocks its first control rod when the first control rod moves towards the rear of the hybrid helicopter, it is necessary for the second hydraulic valve of the second helicopter likewise to block its second control rod when said control rod moves towards the rear of the hybrid helicopter.

Finally, the present invention also provides a method of controlling the claimed hydraulic valve that feeds a servocontrol suitable for modifying the pitch of blades of an aircraft propeller, the assembly comprising the hydraulic valve and the servocontrol being capable of responding to an order from a pilot of the aircraft with practically no delay when said order gives rise to a modification of said pitch at a slow rate, generating a change of propeller blade pitch of less than two degrees of pitch per second, the hydraulic valve having a control rod suitable for being moved in translation along a first longitudinal translation axis by flight controls of an aircraft and an outlet rod suitable for being moved in translation along a second longitudinal translation axis, and for transferring a hydraulic fluid between the servocontrol and the hydraulic valve.

During said method, the movement in translation of the control rod is blocked temporarily when the difference between a first movement of the control rod and a second movement of the outlet rod exceeds a predetermined threshold, above which threshold the longitudinal position of the outlet rod is no longer representative of the longitudinal position of the control rod.

Furthermore, the control rod is advantageously mechanically linked to the outlet rod so that the second position of the outlet rod, and thus the pitch of the blades, is representative of the position of the pilot control means.

Furthermore, and advantageously, the threshold is determined using the following relationship in which "S" represents the threshold, "$V_1$" represents a rate of angular movement of said blades, "$t_1$" represents the response time of the assembly comprising the hydraulic valve and the servocontrol, "$L_{max}$" represents the maximum stroke of the outlet rod, and "$\phi_{max}$" represents the maximum angular movement of each of said blades:

$$S=(V_1 * t_1)*(L_{max}/\phi_{max})$$

where:
"*" represents the multiplication sign; and
"/" represents the division sign.

It should be observed that t1 represents the time needed for the order given by the pilot to be copied to the blades of the propellers. For example, if it is desired to obtain an angular rate of movement of the blades of the order of 10 degrees of pitch per second with a reaction time of 0.2 seconds, then by using a hydraulic valve having an outlet rod capable of moving through 75 millimeters and a propeller having blades of pitch that can vary between a minimum pitch and a maximum pitch by turning through an angle of 38 degrees, the threshold will be equal to about 3.9 millimeters.

BRIEF DESCRIPTION OF THE DRAWINGS

The invention and its advantages appear in greater detail from the following description of embodiments given by way of illustration with reference to the accompanying figures, in which:

FIG. 5 is a view for explaining the operation of the blocker means; and

FIG. 6 is a view of a hydraulic valve in a second variant of a mechanical embodiment.

DETAILED DESCRIPTION

Elements that are present in more than one of the figures are given the same references in each of them.

Figure 1:
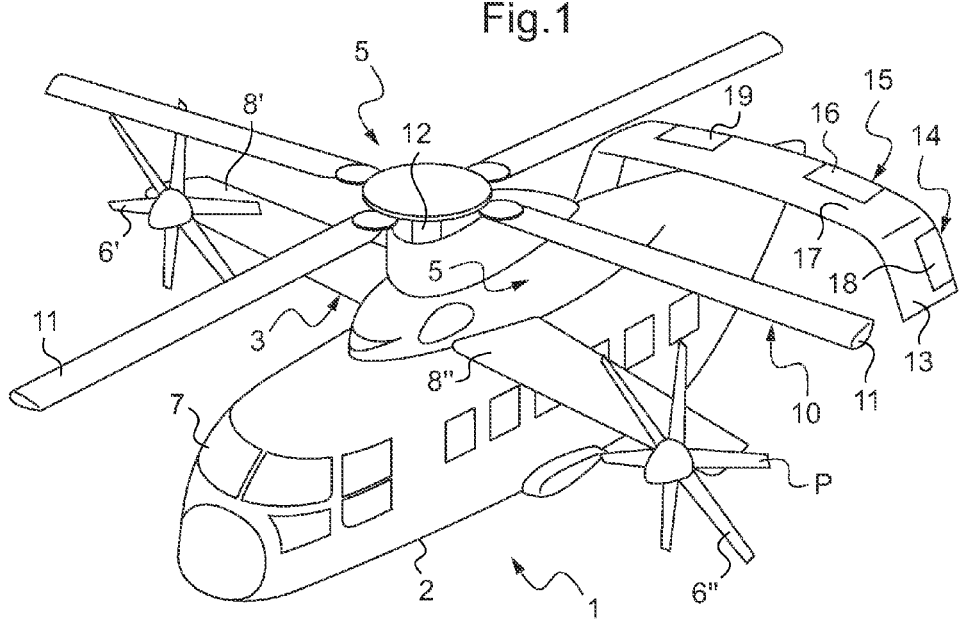
FIG. 1 is a view of a hybrid helicopter.

FIG. 1 shows a hybrid helicopter 1 comprising a fuselage 2 with a cockpit 7 at the front thereof, a rotary wing provided with at least one rotor 10 for driving blades 11 in rotation firstly by means of two turbine engines 5 disposed on top of the fuselage 2, on either side of a longitudinal plane of symmetry of the rotorcraft, and secondly by means of a first main gearbox (MGB) not shown in FIG. 1.

It should be observed that the two turbine engines 5 are not visible in FIG. 1 because of the presence of fairings. Furthermore, the hybrid helicopter 1 is provided with a high wing 3 made up of two half-wings 8' and 8" located at the top of the fuselage 2. The hybrid helicopter 1 is propelled by first and second propellers 6' and 6" driven by the two turbine engines 5, one of the propellers 6' and 6" being located at each of the outer ends of the wing 3.

Furthermore, in the vicinity of the rear end of the fuselage 2, stabilizing and maneuvering surfaces are optionally provided, i.e. for pitch control: a horizontal stabilizer 15 having two pitch-control surfaces 16 and 19 that are movable relative to the front portion 17, and for steering: two vertical stabilizers 14, each at a respective end of the horizontal stabilizer 15.

Specifically, the horizontal stabilizer 15 and the vertical stabilizers 14 form a U-shape that is turned upside-down towards the fuselage 2. Advantageously, the stabilizers 14 that are vertical or inclined relative to the vertical may be constituted by respective non-moving front portions 13 and moving rear portions 18.

This hybrid helicopter 1 is remarkable in particular compared with other aircraft in that the speeds of rotation of the turbine engine outlets, of the propellers, of the rotor, and of the mechanical interconnection system are mutually proportional, with the proportionality ratio being constant under normal conditions of operation of the integrated drive system, regardless of the flight configuration of the hybrid helicopter.

Figure 2:
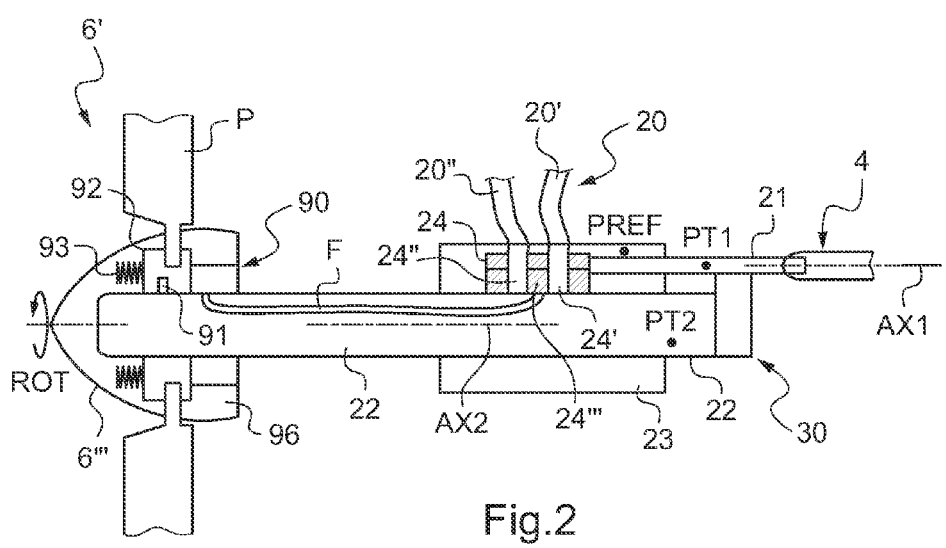
FIG. 2 is a diagrammatic view of an assembly comprising a hydraulic valve and a servocontrol.

FIG. 2 is a view of an assembly comprising a hydraulic valve 20 and a servocontrol 90 suitable for modifying the pitch of the blades P of a propeller, e.g. the first propeller 6' of a hybrid helicopter 1. It should be understood that the second propeller 6" is provided with an identical assembly comprising a hydraulic valve 20 and a servocontrol 90.

Conventionally, the hydraulic valve 20 comprises a control rod 21 connected to the flight controls 4 of the hybrid helicopter, these flight controls being moved by pilot control means such as pedals, or indeed being moved by an electronic computer, for example. The control rod 21 is then suitable for moving in translation along a first longitudinal axis AX1 when the control rod is driven by the flight controls 4.

Furthermore, the hydraulic valve 20 includes an outlet rod 22 that passes longitudinally right through it along a second longitudinal axis AX2 to feed a servocontrol 90 with a hydraulic fluid F. The servocontrol 90 arranged in the hub 6''' of the first propeller 6' shown diagrammatically is then suitable for moving a piston 92 along said second longitudinal axis AX2. It should also be observed that the piston is fastened to the blades P of the first propeller 6', to a return device such as a return spring, and to the outlet rod 22.

Thus, when the flight controls 4 move the control rod 21 along the first longitudinal axis AX1, from left to right relative to the sheet of paper containing in FIG. 2, and thus in a first direction D1 (see FIG. 3), the control rod 21 moves a slide 24. The hydraulic valve 20 then allows a hydraulic fluid F to flow from a hydraulic feed circuit 20' to a channel in the outlet rod 22 via an inlet orifice 24' of the slide 24.

The outlet rod 22 then conveys the hydraulic fluid F to a chamber 96 of the servocontrol 90. The pressure inside said chamber 96 increases, thereby moving the piston 92 in translation. Consequently, the blades P of the first propeller 6' are turned so as to cause their pitch to vary.

Furthermore, the piston 92 also drives movement of the outlet rod 22 via its peg 91. The movement in translation of the rod 22 along the second longitudinal axis AX2 in the first direction D1 enables the position of the outlet rod 22 relative to the slide to be varied. That causes the hydraulic fluid feed to the outlet rod 22 to be stopped. The outlet rod 22 no longer opens out to the inlet orifice 24' of the slide, but opens out instead to shutter means 24m.

In contrast, when the control rod 21 is moved from left to right relative to the plane of the sheet containing in FIG. 2, and thus in the second direction D2 (see FIG. 3), the control rod 21 moves the slide 24 of the servocontrol so as to connect the outlet rod 22 to a hydraulic return circuit 20" via an outlet orifice 24" of the slide 24. The return spring 93 then moves the piston of the first propeller 6'. Consequently, the piston 92 exerts a force on the chamber 96 of the servocontrol 90, thereby expelling hydraulic fluid F from the chamber 96, the expelled hydraulic fluid going to the return hydraulic circuit 20" via the outlet rod 22 and then the outlet orifice 24".

Furthermore, the movement of the piston in translation is accompanied firstly by a change to the pitch of the blades P of the first propeller 6', and secondly by a movement of the outlet rod 22 In translation in the second direction D2. The position of the outlet rod 22 relative to the slide is once more modified, thereby enabling expulsion of the hydraulic fluid F to the hydraulic return circuit 20" to be stopped. The outlet rod 22 no longer opens out to the outlet orifice 24" of the slide, but rather to the shutter means 24m.

Furthermore, the hydraulic valve 20 is provided with blocker means 30, represented diagrammatically in FIG. 2. In one embodiment, the blocker means 30 are purely mechanical. These various components then enable the control rod 21 to be blocked temporarily when the pilot moves control means, e.g. pedals, quickly and/or through a large amplitude.

The assembly comprising the hydraulic valve 20 and the servocontrol 90 is designed to respond to slow actions, generating a change in the pitch of the propeller blades at a rate that is less than or equal to two degrees per second, for example, in particular when the pitch of the blades of the first and second propellers of the hybrid helicopter 1 are varied collectively by the same quantity.

Consequently, when the assembly comprising the hydraulic valve 20 and the servocontrol 90 is called on to respond to fast actions, it presents a certain delay, since said assembly cannot respond instantaneously to the demand The blocker means 30 then serve to solve the problem by blocking the control rod 21 in such a situation. The pilot will observe that the flight control is blocked and will understand that the order given goes beyond the actuating capacities of the assembly comprising the hydraulic valve 20 and the servocontrol 90.

More precisely, the blocker means 30 block the control rod 21 on observing, advantageously mechanically, that a difference DIFF between a first movement of the control rod 21 and the second movement of the outlet rod 22 exceeds a predetermined threshold. Thus, the blocker means 30 block the control rod 21 when the movement of the control rod 21 relative to the outlet rod 22 is greater than said threshold.

When the pilot acts on the flight control, the control rod travels a first distance during a first movement. In response, the outlet rod travels a second distance during a second movement. Said difference DIFF that is compared with the threshold is then equal to the first movement minus the second movement, and thus to the first distance minus the second distance. The difference DIFF is thus a length value, e.g. expressed in millimeters. Thus, if the control rod 21 moves too quickly relative to the movement of the outlet rod 22, the stroke of the control rod 21 is blocked by the blocker means 30, thereby leaving the control rod time to respond to the given order corresponding to the third position at which the pilot control means are blocked, so that the control rod 21 and the outlet rod can move over the same distance.

Consequently, the blocker means prevent said difference DIFF exceeding a threshold beyond which the first longitudinal position of the control rod 21, e.g. the first longitudinal position of a first given point PT1 of the control rod relative to a fixed reference point PREF of the hydraulic valve 20 is no longer representative of a second longitudinal position of the outlet rod 22, e.g. the second longitudinal position of a second given point PT2 of the outlet rod relative to a fixed reference point PREF of the hydraulic valve 20, because of the delay generated by the hydraulic valve 20.

Advantageously, the threshold is determined as a function of the characteristics of each propeller and of the assembly comprising the hydraulic valve 20 and the servocontrol 90. For example, the threshold is determined with the help of the following relationship where "S" represents said threshold, "$V_1$" represents a rate of angular movement of said blades, "$t_1$" represents the response time of the assembly comprising the hydraulic valve and the servocontrol, usually measured by testing, "$L_{max}$" represents the maximum stroke of the outlet rod, and "$\phi_{max}$" represents the maximum angular movement of each of said blades:

$$S = (V_1 * t_1) * (L_{max}/\phi_{max})$$

where:
"*" represents the multiplication sign; and
"/" represents the division sign.

Advantageously, the blocker means 30 link the outlet rod 22 mechanically to the control rod 21 so as to represent means for copying position.

FIGS. 3 to 5 and 6 show respectively first and second variants of a mechanical embodiment of the invention. In either variant, the blocker means 30 for blocking the hydraulic valve 20 comprise a differential lever L suitable for mechanically linking the control rod 21 and the outlet rod 22.

Furthermore, the blocker means 30 is provided with at least one movable abutment 70, 80 that co-operates with the differential lever L to block the control rod 21 when said threshold is reached. When the control rod 21 moves too fast, the differential lever is blocked by the movable abutment 70, 80. Each movable abutment may be constrained to move in translation with the outlet rod 22.

Thus, when the control rod 21 is blocked, the hydraulic valve 20 continues to feed hydraulic fluid F to the servocontrol 90. The pitch of the propeller blades is modified, thereby implying that the outlet rod 20 moves in translation. Together with the outlet rod 22, each movable abutment 70, 80 moves along a third longitudinal translation axis AX3 parallel to the first and second longitudinal translation axes. The differential lever L is no longer blocked by the movable abutment 70, 80 and the pilot can once more act on the control means. The differential lever L has first, second, and third branches 30', 40, and 50.

More precisely, the first and third branches 30' and 50 are fastened respectively to the control rod 21 and to the outlet rod 22, with the second branch 40 being hinged to the first and third branches via its fixed end 41. A attack rod 4' of the flight controls 4 is then hinged to the second branch 40, e.g. between the first hinge point PTA1 of the first branch 30' to the second branch 40, and the second hinge point PTA2 of the third branch 50 to the second branch 40. Since the first hinge point may optionally move in a circular arc, the first branch 30' comprises a fork 31 and a link 32 that are hinged to each other, the fork 31 being fastened to the control rod 21 so as to extend it, while the link 32 is hinged of the fork 31 and to the second branch 40. Consequently, a movement of the first hinge point PTA1 does not run the risk of generating excessive forces on the control rod 21.

Furthermore, the outlet rod 22 of the hydraulic valve 20 is suitable both for moving in translation along a second longitudinal axis AX2, and for moving in rotation about said second longitudinal axis AX2 as a result of its connection to a propeller. Consequently, the third branch is mechanically linked to the outlet rod via fastener means 55 that are fastened to the body 58 of the third branch 50, constraining said third branch 50 to move in translation with the outlet rod 22 along the second longitudinal axis AX2, while leaving the outlet rod 22, free to move relative to the third branch in rotation about the second longitudinal axis AX2.

Reference can be made to the literature for a description of such fastener means 55. In short, the fastener means could include a receptacle 103 secured to the body 58, closure means 101, a needle bearing and ball abutment 100, and a nut 102. Thus, the closure means 101, e.g. a plate, are inserted around the outlet rod 22, and then the needle bearing and ball abutment 100 is put into place. An operator then screws a nut 102 onto the end of the outlet rod 22 so as to press the needle bearing and ball abutment 100 against a shoulder 2T of the control rod 22. From this moment, the operator places the receptacle 103 of the fastener means 55 for the third branch 50 around the needle bearing and ball abutment 100, and then closes the receptacle 103 by screwing the closure means 101 into the receptacle 103.

The bottom ring 100' of the needle bearing and ball abutment 100 is then blocked between the nut 102 and the shoulder 22' of the outlet rod 22, while the outer ring 100" of the needle bearing and ball abutment 100 is blocked between a shoulder 55' of the receptacle and the closure means 101. Consequently movement of the rod along the direct direction D1 causes the third branch 50 to move by acting successively and functionally via the nut 102, the needle bearing and ball abutment 100, the closure means 101, and the receptacle 103.

In contrast, movement of the outlet rod along second direction D2 generates movement of the third branch 50 by acting successively and functionally via the shoulder 22' of the control rod 22, the needle bearing and ball abutment 100, and the shoulder 55' of the receptacle 103. In addition, the third branch 50 has a first finger 51 secured to the body 58 and hinged to the second branch 40, i.e. to the fixed end 41 of the second branch 40. Since the first finger 51 extends the outlet rod 22, the third branch 50 comprises in succession: the fastener means 55; the body 58; and then the first finger 51 along the second longitudinal axis AX2.

Finally, each movable abutment 70, 80 of the blocker means is constrained to move in translation with a second finger 52 of the third branch 53. It should be observed that the first finger 51, the second finger 52, the body 58, and indeed a receptacle of the fastener means 55, form a single part obtained by conventional machining.

Figure 3:
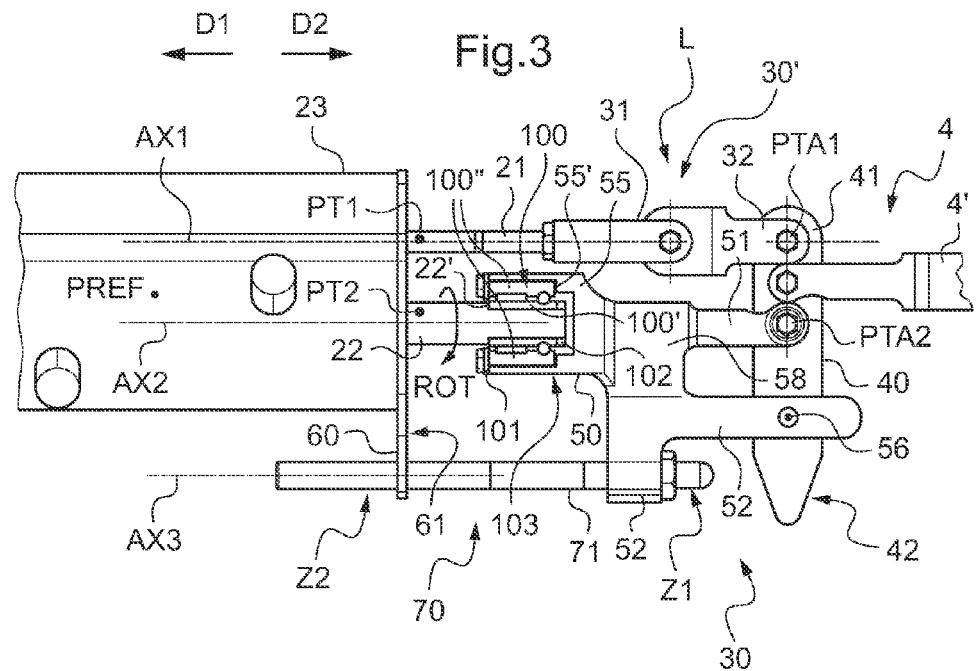
FIGS. 3 and 4 are views of a hydraulic valve in a first variant of a mechanical embodiment.
Figure 4:
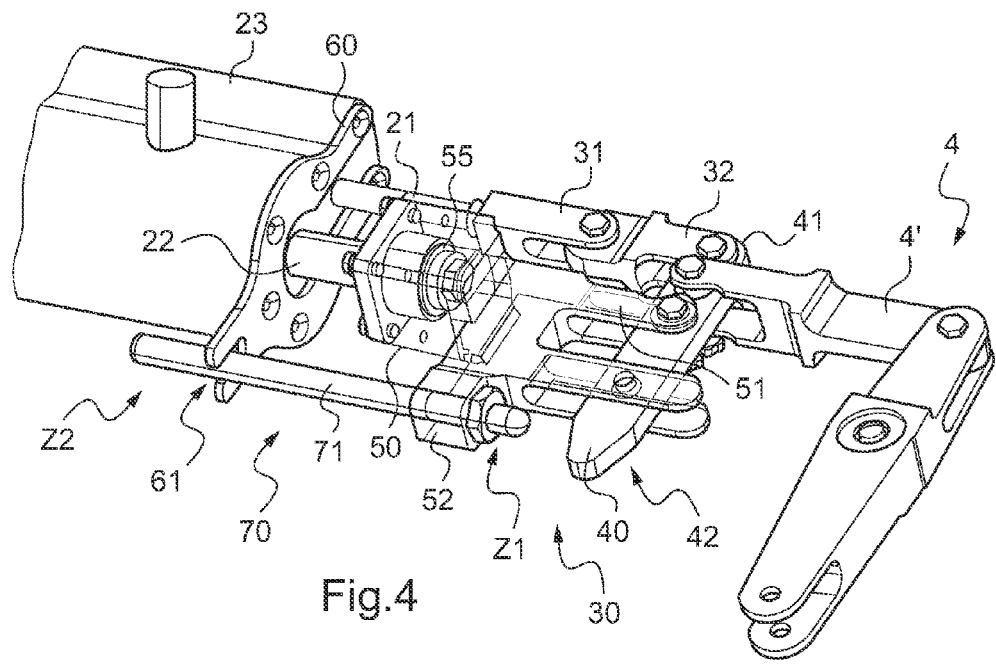

In the first variant shown in FIGS. 3 to 5, the blocker means have a single movable abutment, i.e. a first movable abutment 70 provided with a first stop rod 71. The second finger is L-shaped, the first stop rod 71 is screwed in a tapped hole formed in the base of the second finger 52, and said base is substantially orthogonal to the second longitudinal axis AX2. This first stop rod 71 then passes through the second finger in order to present a first end zone Z1 facing the free end 42 of the second branch 40.

As explained below, the first end zone is suitable for co-operating with said free end 42 of the second branch 40 so as to block the control rod 21 beyond said threshold, when said free end moves angularly so as to approach the outlet rod 22 or indeed the outer casing 23 of the hydraulic valve 20. Furthermore, the outer casing 23 is advantageously provided with a stop plate 60 having a blind orifice 61 through which a second end zone 22 of the first stop rod 71 passes.

Thus, if the outlet rod tends to cause the third branch 50 to turn about the second longitudinal axis AX2, in spite of the presence of the fastener means 50, then the second end zone Z2 of the first stop rod comes into contact with the edges of the blind orifice 61. Rotary movement of the third branch 50 is thus stopped. FIG. 5 explains how the blocker means 30 operate.

When the pilot acts on the control means, the attack rod 4' thereof exerts a force on the second branch 40 to which said attack rod 4' is hinged. More precisely, in the example shown, the attack rod 4' pulls on the second branch 40. Since the outlet rod has not yet been moved by the piston 92 of the propeller, the second branch 40 turns about the second hinge point PTA2 connecting the second branch 40 to the third branch 50. Providing the movement of the control rod is relatively slow, then the difference DIFF between the first movement of the control rod 21 and the second movement of the outlet rod 22 remains below the predetermined threshold. Consequently, the outlet rod 22 starts moving before the angular movement θ of the second branch brings the free end 42 of the second branch 40 into contact with the first movable abutment 70.

On the contrary, the movement of the outlet rod 22 moves the free end 42 of the second branch 40 away from the first movable abutment 70. In contrast, when the movement of the control rod is relatively fast, the difference DIFF between the first movement of the control rod 21 and the second movement of the outlet rod 22 is greater than the predetermined threshold.

The free end 42 of the second branch 40 then comes into contact with the first movable abutment 70, specifically with the first end zone of the first stop rod 71. The second branch 40 is then blocked, so the control rod 21 can no longer be moved. The pilot is immediately aware of the situation since the control means operated by the pilot are also in abutment.

Nevertheless, the pitch of the propeller blades will be modified, thereby causing the outlet rod 22 to move. Consequently, the free end 42 of the second branch 40 will move away from the first movable abutment 70, with the second branch 40 turning about the first hinge point PTA1. The differential lever is no longer in contact with the movable abutment, thereby enabling the pilot to continue the piloting action.

It should be observed that this first variant has only one movable abutment. On a hybrid helicopter 1, the movable abutment is advantageous only during fast movement of the control rod 21. Such movement normally occurs during yaw control seeking to increase the pitch of the blades of one of the propellers while decreasing the pitch of the blades of the other propeller.

Consequently, the flight controls will necessarily be blocked either by the blocker means for the hydraulic valve of the first propeller, or by the blocker means for the hydraulic valve of the second propeller. Nevertheless, with reference to FIG. 6, it is possible to provide the blocker means with first and second movable abutments 70 and 80 that are constrained to move in translation with the third branch 50 of the differential lever L.

The second free end is then blocked with respect to turning between the first movable abutment 70 and the second movable abutment 80. Consequently, the first finger 52 is U-shaped, with the base of the second finger 52 being secured to the body 58. In contrast, the first and second side bars of the finger 52 are substantially perpendicular to the second longitudinal axis AX2.

The first and second side bars of the finger 52 then have first and second rods 71 and 81 of the first and second movable abutments 70 and 80 passing respectively through them. Thus, if the free end 42 of the second branch 40 tends to approach the outlet rod 22, the free end 42 runs the risk of being blocked by the first rod 71 of the first movable abutment 70 on performing a first angular movement θ1. Conversely, if the free end 42 of the second branch 40 tends to move away from the outlet rod 22, then the free end 42 runs the risk of being blocked by the second rod 81 of the second movable abutment 80 on performing a second angular movement θ2.

Finally, independently of the selected variant, it is possible to envisage piercing the second and third branches 40 and 50 so that, during maintenance operations, these branches can be anchored in a given position by means of a pin inserted in the hole pierced through the second and third branches 40 and 50.

Naturally, the present invention may be subjected to numerous variants as to its implementation. Although several embodiments are described, it will readily be understood that it is not conceivable to identify exhaustively all possible embodiments. It is naturally possible to envisage replacing any of the means described by equivalent means without going beyond the ambit of the present invention. For example, the embodiment described makes use of blocking means that are purely mechanical. Nevertheless, it is possible to envisage arranging movement sensors that enable a computer to determine the difference between the first movement of the control rod and the second movement of the outlet rod, with the computer then actuating means that are suitable for blocking said control when difference exceeds a predetermined threshold.

What is claimed is:

1. A hydraulic valve assembly comprising:
   a hydraulic valve;
   a control rod configured to be moved in translation along a first longitudinal axis by flight controls of an aircraft;
   a servocontrol;
   an outlet rod configured to be moved in translation along a second longitudinal axis and configured to transfer a hydraulic fluid between the servocontrol and the hydraulic valve; and
   a blocker device configured to block a movement of the control rod when a difference between a first movement of the control rod and a second movement of the outlet rod exceeds a predetermined threshold, wherein the blocker device includes:
   at least one moveable abutment configured to block the movement of the control rod when the predetermined threshold is reached and configured to move in longitudinal translation with the outlet rod; and
   a differential lever configured to mechanically link the control rod to the outlet rod and to cooperate with the at least one moveable abutment.

2. The hydraulic valve assembly as recited in claim 1, wherein the differential lever includes a first, a second, and a third branch, the first branch fastened to the control rod, the third branch fastened to the outlet rod, and the second branch hinged to the first and the third branches and configured to be hinged to the flight controls.

3. The hydraulic valve assembly as recited in claim 2, wherein the outlet rod is rotatable about the second longitudinal axis, and wherein the third branch includes a fastener configured to constrain the outlet rod to move in translation with the third branch along the second longitudinal axis while leaving the outlet rod free to rotate relative to the third branch about the second longitudinal axis.

4. The hydraulic valve assembly as recited in claim 2, wherein the third branch includes a first finger configured to extend the outlet rod and hinged to the second branch.

5. The hydraulic valve assembly as recited in claim 2, wherein the second branch includes a fixed end hinged to the first branch and a free end, and wherein the at least one moveable abutment blocks an angular movement of the free end when the predetermined threshold is reached.

6. The hydraulic valve assembly as recited in claim 5, wherein the at least one moveable abutment is a first moveable abutment having a first stop rod passing through a second finger of the third branch, wherein the first stop rod has a first end zone configured to cooperate with the free end so as to block the second branch.

7. The hydraulic valve assembly as recited in claim 6, further comprising an outlet casing having a stop plate, wherein a second end zone of the first stop rod passes through an orifice disposed in the stop plate.

8. The hydraulic valve assembly as recited in claim 2, wherein the at least one moveable abutment is a first and a second moveable abutment constrained to move in translation with the outlet rod and with the third branch, the second branch having a free end that is blocked angularly between the first and the second moveable abutments.

9. The hydraulic valve assembly as recited in claim 8, wherein the third branch includes a hole configured to receive a pin configured to block the second branch.

10. A hybrid helicopter having a fuselage and comprising:
   a rotary wing disposed above the fuselage;
   an auxiliary lift surface having first and second half-wings each extending on a side of the fuselage and each including a propeller; and
   the hydraulic valve assembly as recited in claim 1.

11. The hybrid helicopter as recited in claim 10, wherein the at least one moveable abutment is a first moveable abutment configured to be moved in translation longitudinally together with the outlet rod.

12. A hydraulic valve assembly comprising:
   a hydraulic valve;
   a control rod configured to be moved in translation along a first longitudinal axis by flight controls of an aircraft;
   a servocontrol;
   an outlet rod configured to be moved in translation along a second longitudinal axis and configured to transfer a hydraulic fluid between the servocontrol and the hydraulic valve; and
   a blocker device configured to block a movement of the control rod when a difference between a first movement of the control rod and a second movement of the outlet rod exceeds a predetermined threshold, wherein the blocker device includes:
      at least one moveable abutment configured to block the movement of the control rod when the predetermined threshold is reached and configured to move in longitudinal translation with the outlet rod; and
      a differential lever configured to mechanically link the control rod to the outlet rod and to cooperate with the at least one moveable abutment;
   wherein the differential lever includes a first, a second, and a third branch, the first branch fastened to the control rod, the third branch fastened to the outlet rod, and the second branch hinged to the first and the third branches and configured to be hinged to the flight controls; and
   wherein the first branch includes a fork and a link hinged to each other, the fork fastened to the control rod and the link hinged to the second branch.

13. A hydraulic valve assembly comprising:
   a hydraulic valve;
   a control rod configured to be moved in translation along a first longitudinal axis by flight controls of an aircraft;
   a servocontrol;
   an outlet rod configured to be moved in translation along a second longitudinal axis and configured to transfer a hydraulic fluid between the servocontrol and the hydraulic valve; and
   a blocker device configured to block a movement of the control rod when a difference between a first movement of the control rod and a second movement of the outlet rod exceeds a predetermined threshold, wherein the blocker device includes:
      at least one moveable abutment configured to block the movement of the control rod when the predetermined threshold is reached and configured to move in longitudinal translation with the outlet rod; and
      a differential lever configured to mechanically link the control rod to the outlet rod and to cooperate with the at least one moveable abutment;
   wherein the differential lever includes a first, a second, and a third branch, the first branch fastened to the control rod, the third branch fastened to the outlet rod, and the second branch hinged to the first and the third branches and configured to be hinged to the flight controls; and
   wherein the at least one moveable abutment is constrained to move in translation with the outlet rod and with the third branch.

* * * * *